Aug. 23, 1966   K. K. KROFFKE   3,267,965
PILOT OPERATED SPOOL VALVE
Filed March 28, 1963   2 Sheets-Sheet 2

INVENTOR.
Kenneth K. Kroffke.
BY Balluff and McKinley
ATTORNEYS.

3,267,965
PILOT OPERATED SPOOL VALVE
Kenneth K. Kroffke, Parma, Ohio, assignor to Airmatic Valve, Inc., Cleveland, Ohio, a corporation of Ohio
Filed Mar. 28, 1963, Ser. No. 268,677
8 Claims. (Cl. 137—625.64)

This invention relates to valves of the type in which a valve spool is axially shiftable to alternately connect each of a pair of work ports to an inlet port and to an exhaust port. A solenoid operated pilot valve may be employed for shifting the spool in one or in both directions. In prior valves of this type employing a single solenoid operated pilot valve to shift the valve spool in one direction, a spring has been employed to return the spool to its neutral position. In valves employing a solenoid operated pilot valve at each end of the spool, springs have been employed acting on both ends of the valve spool in order to center the spool in its neutral position when both pilot valves are de-energized.

The present invention is particularly directed to an improved means for returning the valve spool to its neutral position, or for centering the valve spool when a pilot valve is employed for shifting the valve spool in each direction. The improved centering means comprises a plunger reciprocably mounted in the end of the valve spool with the inner end of the chamber in which the plunger reciprocates being connected to the inlet pressure so that, as the spool is shifted in one direction, the outer end of the plunger engages the end wall of the bore in which the spool reciprocates so that further movement of the spool retracts the plunger with the chamber whereby the pressure fluid in the chamber will react against the spool to return it to its neutral position when the pilot valve is de-energized. The return means consisting of the plunger may be mounted in one or both ends of the spool valve, depending upon whether the valve is a single or double solenoid operated valve.

It is a principal object of the invention to provide a new and improved means for returning an axially reciprocable spool valve to its neutral position.

It is a further object of the invention to provide a valve of the type described which eliminates the use of springs for returning the valve spool to its neutral position.

Other and further objects of the invention will be apparent from the following description and claims and may be understood by reference to the accompanying drawings, of which there are two sheets, which by way of illustration show preferred embodiments of the invention and what I now consider to be the best mode of applying the principles thereof. Other embodiments of the invention may be used without departing from the scope of the present invention as set forth in the appended claims.

Figure 1:
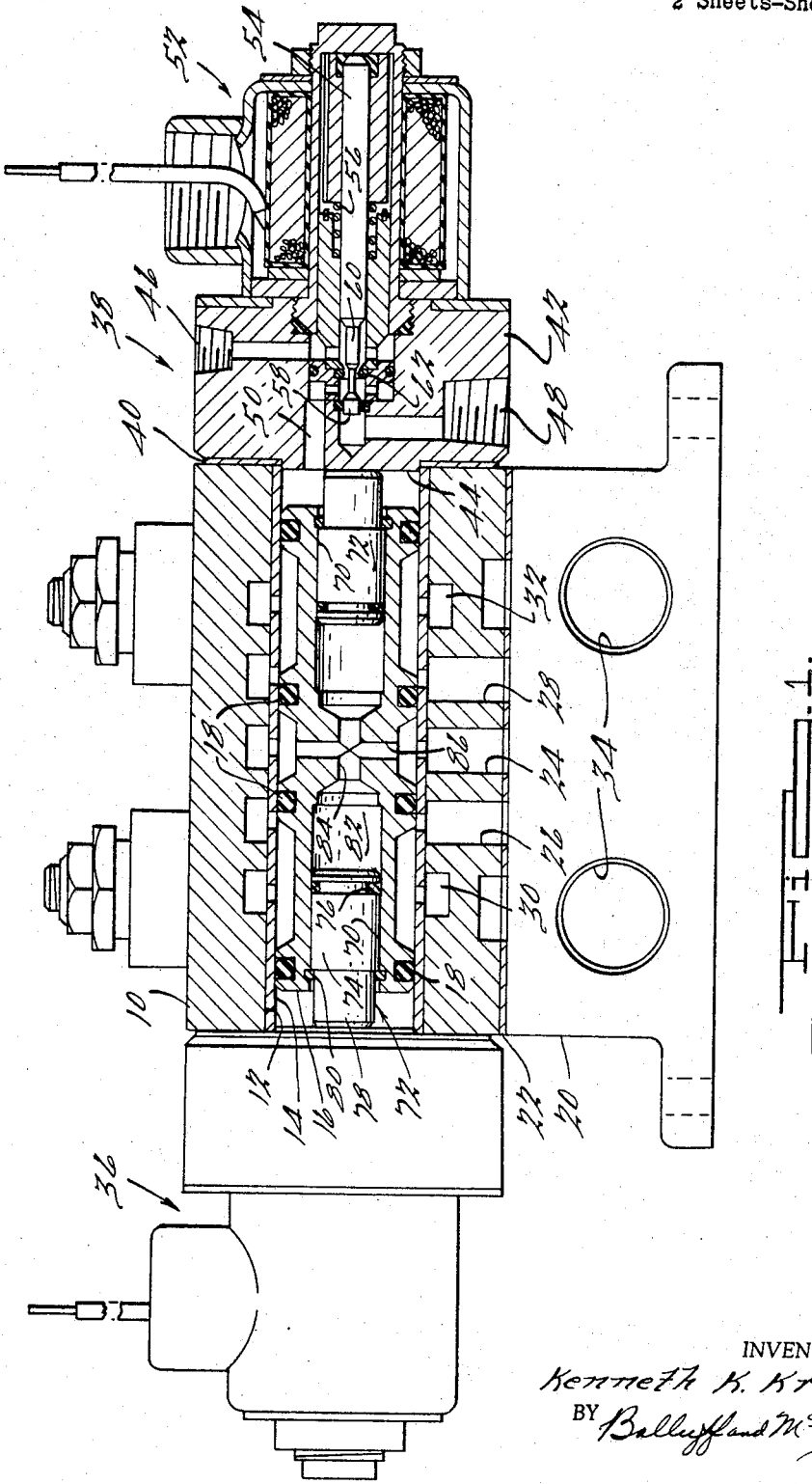
FIGURE 1 is a sectional view with parts in elevation of a valve constructed according to the present invention.

In FIGURE 1 there is shown a valve comprising a valve body 10 having an axial bore 12 therein lined by a sleeve 14. A valve spool 16 is reciprocable within the sleeve 14 and is provided on its outer periphery with a series of O-rings 18 separated by portions of reduced diameter as shown. The valve body 10 may be mounted on a base 20 with a gasket 22 therebetween. The valve body is provided with an inlet port 24, a pair of work ports 26 and 28, and a pair of exhaust ports 30 and 32, all of which communicate with the interior of the bore 12 through apertures in the sleeve 14. The ports 24, 26, 28, 30 and 32 may communicate with passages within the base member 20 leading to suitable fluid connections such as the work ports 34 illustrated in FIGURE 1.

Solenoid operated pilot valves 36 and 38 are mounted on opposite ends of the valve body 10 with gaskets 40 interposed between the pilot valves 36 and 38 and the valve body. The valves 36 and 38 may be identical in construction and each includes a block 42 having an end wall 44 closing the end of the bore 12 and provided with an inlet port 46, an exhaust port 48, and an axially extending passage 50 communicating with the interior of the bore 12. A solenoid 52 is mounted on the valve block 42 and includes an axially shiftable plunger 54 normally retained in the position shown by a spring 56 so that the outer end 58 of the plunger engages a valve seat consisting of an O-ring to close communication between the passage 50 and the exhaust port 48 while opening the communication between inlet 46 and passage 50 so that pilot pressure fluid may be supplied to the right-hand end of the bore 12 to react against the valve spool 16. When the solenoid 52 is energized, the plunger 54 will be shifted to disengage the end 58 from its valve seat and engage the portion 60 with the O-ring 62 so as to close the inlet port 46 and open the communication between passage 50 and exhaust port 48, thereby permitting the pilot pressure fluid in the right-hand end of the bore to exhaust. The solenoid operated pilot valve 36 is adapted to supply pilot pressure fluid to the left-hand end of the bore 12 to shift the valve spool 16 to the right. The valve spool 16 is shown in FIGURE 1 in its neutral position wherein the two interior O-rings 18 seal off the work ports 26 and 28 from the inlet port 24 while the work ports 26 and 28 communicate with the exhaust ports 30 and 32.

The valve spool 16 is provided with an axially extending bore 70 at each end thereof and a plunger 72 is reciprocably mounted within each of the bores 70. The plunger 72 has a main body portion 74 provided with an O-ring 76 sealingly engaging the bore 70 and a smaller diameter outer end 78 adapted to engage the end wall of the bore which is provided by the valve block 42. A split washer 80 located within a groove adjacent the outer end of the bore 70 engages the shoulder on the plunger 72 to limit movement of the plunger outwardly.

The inner end of each bore 70 provides a chamber 82 which communicates at its inner end with the inlet port 24 through an axial passage 84 and a radially extending passage 86 communicating with the interior of the sleeve 14.

With the valve spool in the position shown and both of the solenoid valves energized or de-energized, the pressure on opposite ends of the spool will be equal so that the spool will remain in its neutral position. If one of the solenoids is energized so as to connect the right-hand end of the bore 12 to exhaust and supply the left-hand end of the bore with pilot pressure fluid, the spool will be shifted to the right-hand end of the bore to the position shown in FIGURE 2 to connect the work port 28 to the inlet port 24 while closing the communication between the work port 28 and its exhaust port 32. The work port 26 will remain in communication with its exhaust port 30. During movement of the valve spool 16 the plunger 72 in the right-hand end of the spool will be retracted since the area of the plunger is substantially less than the area of the left-hand end of the spool acted upon by the pilot pressure. When the pilot pressure in the left end of bore 12 is exhausted through the valve 36, the inlet pressure within the chambers 70 will react against the inner ends of the plunger 72 to force the spool 16 toward the left end of the bore 12 until the left-hand plunger 72 engages the end wall of the bore, whereupon the pressures acting in opposite directions on the spool 16 will be balanced and the spool will remain in its neutral position. Subsequent shifting of the spool to the left end of the bore by the application of pilot pressure to the right-hand end of the spool will retract the left-hand plunger 72 so that the inlet pressure will be effective to return the spool to its centered or neutral position when the pilot pressure is exhausted from the right-hand end of the bore 12.

Figure 3:
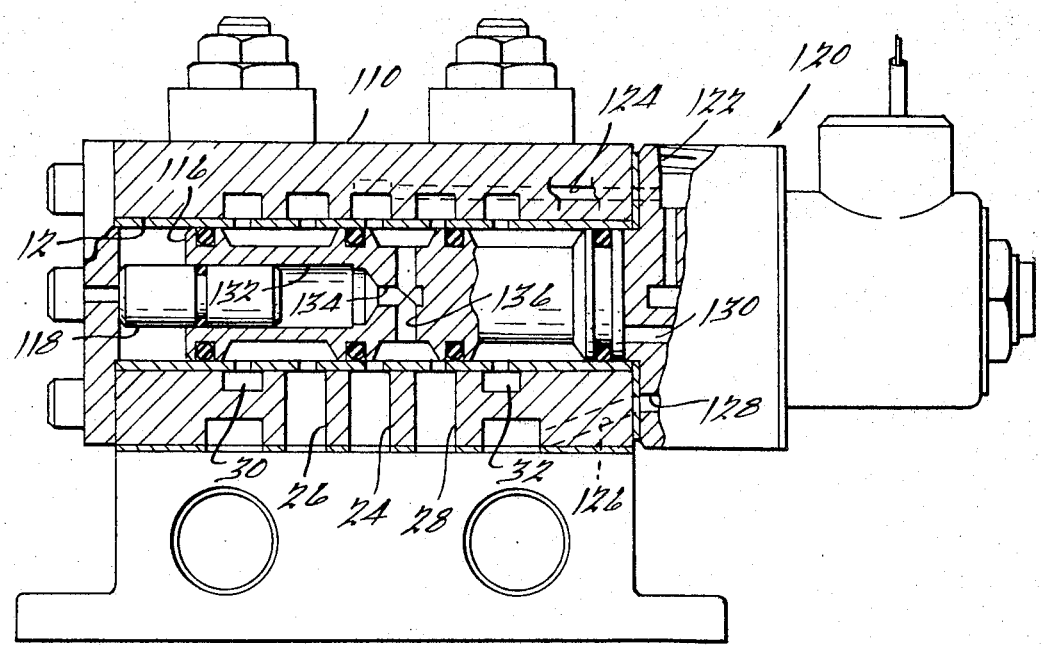
FIGURE 3 is a sectional view with parts in elevation illustrating a modified form of the invention.

In the modification of the invention shown in FIGURE 3 the valve spool 116 is provided with a plunger 118 only in its left-hand end and only a single solenoid operated pilot valve 120 is employed for shifting the valve spool 116. The spool 116 is shown in FIGURE 3 in its neutral position in which the inlet port 24 may be in communication with the work port 28 while the other work port 26 communicates with its exhaust port 30.

FIGURE 3 also illustrates a modified form of porting arrangement in which the port 122 constitutes the inlet port of the valve 120 and a passage 124 supplies the inlet port 24 in the valve body 110 with pressure fluid from the inlet port 122. The valve body 110 is also provided with a passage 126 which communicates the exhaust ports 30 and 32 with the exhaust passage 128 in valve 120.

When pilot pressure is supplied to the right-hand end of the spool 16 through passage 130, the spool will be shifted to the left-hand end of the bore 12 to connect work port 26 to inlet port 24 and connect the work port 28 to the exhaust port 32. The plunger 118 is retracted within the bore 132 which remains in communication with the inlet port 24 through the axial passage 134 and the radial passage 136 in the spool 116. The fluid pressure in the right-hand end of the bore 132 is thereby utilized to return the spool 116 to the right-hand end of the bore 12 when the pilot pressure is exhausted from the right-hand end of the bore 12.

Figure 2:
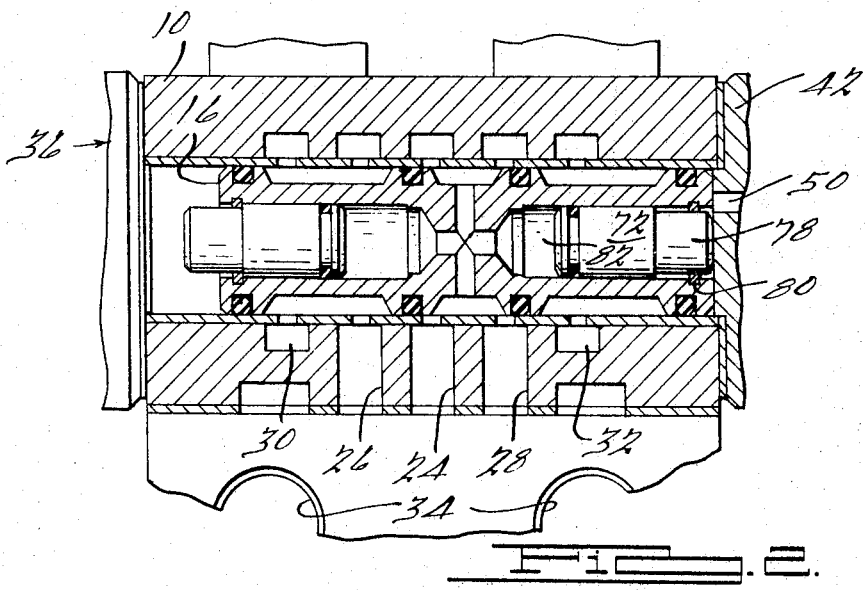
FIGURE 2 is a fragmentary sectional view similar to FIGURE 1 but showing the valve spool in a different position.

The air pressure means for either centering the spool valve in the form of the invention shown in FIGURES 1 and 2 or for returning the spool to its neutral position in the form of the invention shown in FIGURE 3 thus eliminates the use of any springs for accomplishing these functions which eliminates the possibility of breakage of the springs conventionally employed for this purpose and substantially reduces maintenance and servicing problems in a valve of this type. Moreover, it is to be noted that, since the chambers within which the plungers reciprocate are at all times connected to the inlet port, the pressure therein remains constant and a constant pressure is effective to return or center the spool valve as opposed to the nonuniform spring rate available for this purpose when springs are employed as in conventional constructions.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. In a flow control valve, a valve body having a bore therein, an inlet port, a pair of exhaust ports and a pair of work ports communicating with said bore, a spool valve reciprocable in said bore, said spool valve being constructed and arranged relative to said inlet port so that said inlet port is always open, said spool valve being constructed so as in one position to connect one work port with said inlet port while the other work port is connected to an exhaust port, means at one end of said spool valve for shifting said spool valve in one direction to connect said other work port to said inlet port and said one work port to the other exhaust port, said spool valve having a compression chamber at the other end thereof and a plunger reciprocable in said chamber, passage means establishing constant communication between the inner end of said chamber and said inlet port in said bore, the outer end of said plunger being engageable with the end wall of said bore whereby shifting of said spool valve in said one direction causes said plunger to retract into said compression chamber whereby the pressure fluid in said chamber will shift said spool valve in the opposite direction.

2. In a flow control valve, a valve body having a bore therein, an inlet port, a pair of exhaust ports and a pair of work ports communicating with said bore, a spool valve reciprocable in said bore, said spool valve being constructed and arranged relative to said inlet port so that said inlet port is always open, said spool valve being constructed so as in one position to connect one work port with said inlet port while the other work port is connected to an exhaust port, actuating means at one end of said spool valve operable upon energization thereof for shifting said spool valve in one direction to connect said other work port to said inlet port and said one work port to the other exhaust port, said spool valve having a compression chamber at the other end thereof and a plunger reciprocable in said chamber, passage means establishing constant communication between the inner end of said chamber and said inlet port in said bore, the outer end of said plunger being engageable with the end wall of said bore whereby shifting of said spool valve in said one direction causes said plunger to retract into said compression chamber whereby the pressure fluid in said chamber will shift said spool valve in the opposite direction when said actuating means is de-energized.

3. In a flow control valve, a valve body having a bore therein, an inlet port, a pair of exhaust ports and a pair of work ports communicating with said bore, a spool valve reciprocable in said bore, said spool valve being constructed and arranged relative to said inlet port so that said inlet port is always open, said spool valve being constructed so as in one position to connect one work port with said inlet port while the other work port is connected to an exhaust port, a pilot valve for supplying pilot pressure to one end of said spool valve for shifting said spool valve in one direction to connect said other work port to said inlet port and said one work port to the other exhaust port, said spool valve having a compression chamber at the other end thereof and a plunger reciprocable in said chamber, passage means establishing constant communication between the inner end of said chamber and said inlet port in said bore, the outer end of said plunger engaging the end wall of said bore whereby shifting of said spool valve in said one direction causes said plunger to retract into said compression chamber whereby the pressure in said chamber will shift said spool valve in the opposite direction when said pilot pressure is exhausted.

4. In a flow control valve, a valve body having a bore therein, an inlet port, a pair of exhaust ports and a pair of work ports communicating with said bore, a spool valve reciprocable in said bore for alternately connecting said work ports with said inlet port and an exhaust port, said spool valve being constructed and arranged relative to said inlet port so that said inlet port is always open, means for shifting said spool valve in one direction, said spool valve having a compression chamber therein and a plunger reciprocable in said chamber, passage means communicating the inner end of said chamber with said inlet port in said bore in any position of said spool valve, the outer end of said plunger engaging the end wall of said bore whereby shifting of said spool valve in said one direction causes said plunger to retract into said compression chamber whereby the pressure fluid in said chamber will shift said spool valve in the opposite direction.

5. In a flow control valve, a valve body having a bore therein, an inlet port, a pair of exhaust ports and a pair of work ports communicating with said bore, a spool valve reciprocable in said bore for connecting said work ports alternately to said inlet port and one of said exhaust ports, said spool valve being constructed and arranged relative to said inlet port so that said inlet port is always open, said spool valve having a neutral position wherein both work ports communicate with an exhaust port, means for shifting said spool valve in opposite directions, said spool valve having a compression chamber at each end thereof, a plunger reciprocable in each of said chambers, passage means communicating the inner ends of said chambers with each other and with said inlet port in said bore in all positions of said spool valve, the outer ends of said plungers engaging the end walls of said bore when said spool valve is in said neutral position whereby shifting of said spool valve from said neutral position toward either end of said bore causes one of said plungers to retract into its compression chamber whereby the pressure fluid in said chamber will shift said spool valve in the opposite direction to its neutral position.

6. In a flow control valve, a valve body having a bore therein, an inlet port, a pair of exhaust ports and a pair of work ports communicating with said bore, a spool valve reciprocable in said bore for connecting said work ports alternately to said inlet port and one of said exhaust ports, said spool valve being constructed and arranged relative to said inlet port so that said inlet port is always open, means for shifting said spool valve in opposite directions, said spool valve having a compression chamber at each end thereof, a plunger reciprocable in each of said chambers, passage means communicating the inner ends of said chambers with said inlet port in said bore in all positions of said spool valve, the outer ends of said plungers engaging the end walls of said bore when said spool valve is in a neutral position whereby shifting of said spool valve from said neutral position toward either end of said bore causes one of said plungers to retract into its compression chamber whereby the pressure fluid in said chamber will shift said spool valve in the opposite direction to its neutral position.

7. In a flow control valve, a valve body having a bore therein, an inlet port, a pair of exhaust ports and a pair of work ports communicating with said bore, a spool valve reciprocable in said bore for connecting said work ports alternately to said inlet port and one of said exhaust ports, said spool valve being constructed and arranged relative to said inlet port so that said inlet port is always open, means for selectively supplying fluid under pressure to opposite ends of said bore for shifting said spool valve in opposite directions, said spool valve having a compression chamber at each end thereof, a plunger reciprocable in each of said chambers, passage means communicating the inner ends of said chambers with each other and with said inlet port in said bore in all positions of said spool valve, the outer ends of said plungers engaging the end walls of said bore when said spool valve is in its central position whereby shifting of said spool valve from said central position toward either end of said bore causes one of said plungers to retract into its compression chamber whereby the pressure fluid in said chamber will shift said spool valve back to its central position when the fluid pressure in the end of said bore is exhausted.

8. In a flow control valve, a valve body having a bore therein, an inlet port, a pair of exhaust ports and a pair of work ports communicating with said bore, a spool valve reciprocable in said bore for connecting said work ports alternately to said inlet port and one of said exhaust ports, said spool valve being constructed and arranged relative to said inlet port so that said inlet port is always open, a pilot valve at each end of said bore for supplying pressure fluid to the ends of said spool valve for shifting said spool valve in opposite directions, said spool valve having a compression chamber at each end thereof, a plunger reciprocable in each of said chambers, passage means communicating the inner ends of said chambers with each other and with said inlet port in said bore in all positions of said spool valve, the outer ends of said plungers engaging the end walls of said bore when said spool valve is in its central position whereby shifting of said spool valve from said central position toward either end of said bore causes one of said plungers to retract into its compression chamber whereby the pressure fluid in said chamber is effective to return said spool valve to its central position when the pilot valve pressure is exhausted.

References Cited by the Examiner

UNITED STATES PATENTS

| | | | |
|---|---|---|---|
| 2,468,079 | 4/1949 | Kirkham | 137—538 |
| 2,536,965 | 1/1951 | Taylor | 137—625.63 X |
| 2,729,233 | 1/1956 | Garmager | 137—494 |
| 2,955,617 | 10/1960 | Collins | 137—625.64 |
| 2,993,511 | 7/1961 | Johnson | 137—625.64 |
| 3,126,915 | 3/1964 | Hunt | 137—625.64 X |

M. CARY NELSON, *Primary Examiner.*

MARTIN P. SCHWADRON, *Examiner.*